United States Patent [19]
Nakajima et al.

[11] 3,817,232
[45] June 18, 1974

[54] METHOD AND APPARATUS FOR REDUCING TOXIC COMPOUNDS IN EXHAUST GASES FROM COMBUSTION TYPE POWER PLANT

[75] Inventors: Yasuo Nakajima; Toru Yoshimura; Shin-Ichi Nagumo, all of Yokosuka, Japan

[73] Assignee: Nisson Motor Company, Limited, Yokohama City, Japan

[22] Filed: June 20, 1972

[21] Appl. No.: 264,576

[30] Foreign Application Priority Data
Nov. 25, 1971 Japan.............................. 46-94073
Nov. 22, 1971 Japan.............................. 46-93013

[52] U.S. Cl. ......... 123/119 A, 123/1 A, 113/119 E, 113/198 E, 55/158, 60/278
[51] Int. Cl. ............................................ F02m 25/06
[58] Field of Search ........ 123/119 A, 119 E, 198 E, 123/1 A; 55/158; 60/278, 279

[56] References Cited
UNITED STATES PATENTS
| | | | |
|---|---|---|---|
| 657,770 | 9/1900 | Hedrick | 55/158 |
| 2,444,222 | 6/1948 | Craig | 123/119 E |
| 3,332,216 | 7/1967 | Stern | 55/158 |
| 3,489,144 | 1/1970 | Dibelius et al. | 55/158 X |
| 3,509,694 | 5/1970 | Imai et al. | 55/158 X |

Primary Examiner—Wendell E. Burns

[57] ABSTRACT

Herein disclosed are a method of and apparatus for reducing toxic compounds especially nitrogen oxides in exhaust gases from various power plants of the combustion type, such as the automotive engines and industrial boilers. In the method herein disclosed, the fuel for the power plant is mixed with denitrified air and recirculated exhaust gases and, where desired, with additional fresh air. The denitrified air is obtained by separation of nitrogen molecules from atmospheric air by the use of nitrogen separating means using, for example, a nitrogen impermeable membrane or a certain type of molecular sieve which may be formed of pulverized zeolite. Deterioration of the nitrogen separating ability of the separating means as a result of deposit or accumulation of the nitrogen molecules thereon is cyclically remedied through periodic purging of the nitrogen separating means. The nitrogen oxides in the exhaust gases are reduced about 95 per cent and the hydrocarbons, carbon monoxides and sulfides are reduced about two thirds as compared with the conventional combustion systems.

11 Claims, 6 Drawing Figures

METHOD AND APPARATUS FOR REDUCING TOXIC COMPOUNDS IN EXHAUST GASES FROM COMBUSTION TYPE POWER PLANT

The present invention relates to power plants of combustion type and, more particularly, to a method and apparatus for reducing toxic compounds such as nitrogen oxides contained in exhaust gases from the combustion power plants.

A variety of means have thus far been developed and practised in an attempt to provide useful solution to the air-pollution poblems caused by the operation of the power plants of the combustion type such as the engines of the motor vehicles. It appears that such air-pollution problems arise from the sue of use only the internal combustion engines but even the engines of the external combustion type such as the gas turbines of the closed type. The toxic compounds in the engine exhaust gases usually include nitorgen oxides and unburned or partially burned combustible compounds such as hydrocarbons and carbon monoxides. The hydrocarbons and carbon monoxides tend to be produced as a result of incomplete combustion of the air-fuel mixture in the engines while the nitrogen oxides tend to be produced when the engines are operating at relatively high temperatures, as is well known in the art. Where arrangements are made so that the air-fuel mixture be burned completely before the engine exhaust gases are discharged, the concentration of the nitrogen oxides in the exhaust gases increase by reason of the enhanced chemical reaction between oxygen and nitrogen. If, on the contrary, it is desired that the concentration of the nitrogen oxides be reduced satisfactorily, the combustion of the air-fuel mixture in the engine is liable to become incomplete and, as a result, an increased amount of hydrocarbons and carbon monoxides are produced. Attempts have therefore be made so as to provide compromise between these mutually conflicting requirements especially in the field of the motor industry. The present invention thus contemplates provision of an advanced solution to this problem.

Under the condition in which the combustion engines are driven at relatively high temperatures, the intorgen oxides are produced through chamber reaction between the oxygen and nitrogen in the atmosphere. In the case of the nitrogen monoxide, such reaction takes place as follows:

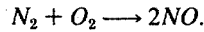

It is known that the nitorgen moxide is produced in a large quantity especially when the engines are operating at high temperatures and, for this reason, the concentration of the nitrogen moxide could be reduced if the engine operates at reduced temperatures. This, however, is reflected by reduction in the combustion efficiencies and accordingly an increase in the fuel consumption rates of the engines, thus failing to provide drastic solution to the air-pollution problems.

The air pollution resulting from the production of the nitrogen monoxide can also be prevented, to some extent, in a manner that the nitrogen monoxide is decomposed into hydrogen and nitrogen by the aid of a suitable catalyst before the exhaust gases are discharged to the open air. For this purpose, the exhaust systems of the engines should be provided with costly devices which require cumbersome maintenance and servicing and which are not fully acceptable for the complete decomposition of the nitrogen oxides.

The present invention proposes a new and novel method and apparatus by which the concentration of the nitrogen oxides in the engine exhaust gases is minimized and, at the same time, the concentration of the hydrocarbons and carbon monoxides is reduced to a considerable extent without resort to provision of an independent system which is specifically adapted to reduce such combustible compounds. The goal of this nature can be attained basically through mixing the fuel for the engine with air from which nitrogen is removed so that the exhaust gases from the engine contain substantially no nitrogen oxides. Such air void of the nitrogen is herein referred to as denitrified air which contains an oxygen gas in a major proportion and chemically stable rare gases in an appreciable proportion. Where, thus, the fuel is combusted in the engine by the aid of the denitrofied air containing mainly the oxygen gas, the combustion will proceed at so rapid a rate as to be objectionable for practical purposes and to invite a danger during operation of the engine.

It is, thus, an object of the present invention to provide a method of and an apparatus for minimizing the concentration of the nitrogen oxides in the exhaust gases from various power plants of the combustion type while silumtaneously reducing the concentration of the unburned hydrocarbons and carbon monoxides in the exhaust gases in a simplified manner.

It is another object of the invention to provide a method of and apparatus for reducing the concentrations of the toxic compounds in the exhaust gases from the combustion power plants without impairing the combustion efficiencies of the power plants.

It is further and another object of the present invention to provide a method and apparatus in which total concentration of the toxic compounds in the exhaust gases from the combustion power plants in a manner which is readily operable with a low cost and in a simple construction.

To achieve these objects of the present invention, a stream of air to be mixed with the fuel for the power plant is first passed through nitrogen separating means so that the air is substantially denitrified to contain an oxygen gas in a major proportion. The thus denitrified air is mixed with the exhaust gases which are recirculated from the power plant at a controlled rate. It is, in this instance, preferred that the denitrified air and recirculated exhaust gases be mixed with each other in a proportion substantially corresponding to the ratio between the oxygen and nitrogen of the normal atmospheric air. The resultant mixture of the denitrified air and recirculated exhaust gases are then mixed with the fuel in a liquid or emulsion state in a predetermined proportion. The combustible mixture obtained in this manner is supplied to the power plant for combustion therein in a usual manner. If desired, especially where the power plant is constantly or temporarily driven under a relatively heavy load, fresh air may be admixed to the denitrified air and recirculated exhaust gases in a controlled total concentration of the toxic compounds in the exhaust gases from the combustion power plants in a manner which is readily operable with a low cost and in a simple construction.

To achieve these objects of the present invention, a stream of air to be mixed with the fuel for the power plant is first passed through nitrogen separating means so that the air is substantially denitrified to contain an oxygen gas in a major proportion. The thus denitrified air is mixed with the exhaust gases which are recirculated from the power plant at a controlled rate. It is, in this instance, preferred that the denitrified air and recirculated exhaust gases be mixed with each other in a proportion substantially corresponding to the ratio between the oxygen and nitrogen of the normal atmospheric air. The resultant mixture of the denitrified air and recirculated exhaust gases are then mixed with the fuel in a liquid or emulsion state in a predetermined proportion. The combustible mixture obtained in this manner is supplied to the power plant for combustion therein in a usual manner. If desired, especially where the power plant is constantly or temporarily driven under a relatively heavy load, fresh air may be admixed to the denitrified air and recirculated exhaust gases in a controlled proportion before the latter two are mixed with each other.

The apparatus which is adapted to realize the method above mentioned generally comprises, in accordance with the present invention, pumping means for delivering a stream of air under pressure, nitrogen separating means operable to substantially denitrifying the air from the pumping means, at least one denitrified-air passageway leading from the nitrogen separating means for passing therethrough the denitrified air from the nitrogen separating means, a valved exhaust recirculation passageway leading from an exhaust system of the combustion plant for recirculating therethrough the exhaust gases from the exhaust system at a controlled rate, a mixing chamber into which the denitrified air and exhaust recirculation passageways are opened at their leading ends for mixing the denitrified air and recirculated exhaust gases with each other in a controlled proportion, and a mixture passageway leading from the mixing chamber to a source of fuel for the power plant for mixing the mixture of the denitrified air and recirculated exhaust gases with the fuel for combustion in the power plant.

It has thus far been an established practice to utilize liquefied air for the separation of the oxygen and nitrogen contained in air. As a result of the research and development recently made, a nitrogen impermeable membrane and a molecular sieve capable of absorbing nitrogen molecules are now available to permit separation of the nitrogen molecules from the atmospheric air in a simple manner. The nitrogen impermeable membrane is a substance which is capable of those molecules, such as for example the nitrogen molecules, which are in an amorphous state or which have sizes larger than predetermined values. Typical of the molecular sieve used as the nitrogen absorbant are zeolites which are silicates processed from artificial or naturally occurring zeolites as starting materials; the artificial or naturally occurring zeolites are first mechanically pulverized and then subjected to certain chemical treatments to desired forms. The zeolites which are processed in this manner are herein termed "processed zeolites."

If, thus, air is passed to the processed zeolite in the fort of granules packed in a certain vessel, the oxygen molecules therein are allowed to pass through the pack of the granules of the zeolite while the nitrogen molecules deposit in the interstices of the space-lattice of the zeolite by reason of the difference in size and shape between the oxygen and nitrogen molecules.

Both the nitrogen impermeable membrane and the processed zeolite of the above described general natures are applicable for the method and apparatus according to the present invention. Whichsoever form of nitrogen separating means may be used in the method and apparatus according to the present invention, the separating means will inevitably be saturated with the nitrogen molecules which are deposited and accumulated on the nitrogen impermeable membrane or the layer of the particles of the zeolite as the denitrifying process proceeds. This results in deterioration of the ability of the nitrogen separating means and, for the purpose of separating the nitrogen molecules from the air at a constant efficiency, it is preferred that the filtering means be cleaned or purposed periodically or cyclically. The nitrogen separating means is thus preferably divided into at least two separate sections through which the air supplied is passed alternately or in succession and the section or sections which are being isolated from the stream of the air are subjected to suction for being purged in the meantime. For this purpose, the apparatus according to the present invention further comprises a nitrogen discharge passageway leading from an inlet side of the nitrogen separating means and a suction pump incorporated in this nitrogen discharge passageway with its suction side communicating with the nitrogen separating means and its discharge side opened to the atmosphere. In this instance, passage means provides alternate communication between the pumping means and at least two sections of the nitrogen separating means and alternate communication between the nitrogen discharge passageway and those of the at least two sections of the nitrogen separating means which are alternately isolated from the pumping means. The passage means of this nature may comprise a pair of air supply passageways providing communication between the pumping means and inlet sides of the sections of the nitrogen separating means through respective flow shut-off valves, a pair of denitrified-air passageways above mentioned sections and the mixing chamber through respective flow shut-off valves, and a pair of nitrogen discharge branch passageway leading respectively from the air supply passageways between the valves thereof and the sections of the nitrogen separating means and communicating through respective flow shut-off valves with the nitrogen discharge passageway incorporating the suction pump. The flow shut-off valve which are associated with one of the above mentioned sections are opened and closed alternately to the flow shut-off valves associated with the other of the sections and the flow shut-off valves provided in the nitrogen discharge branch passageways are closed and opened alternately to each other when the valves in the air supply passageways and denitrified-air passageways are opened and close, respectively. Or otherwise, the at least two sections of the nitrogen separating means may be arranged to be rotatable about an axis and hermetically sealed off from each other. In this instance, the aforesaid passage means comprises apertures which are substantially aligned with each other in a direction parallel to the axis of rotation of the sections of the nitrogen separating means and which are in constant communication with the pumping means and the denitrified-air passageway, respectively, and an aperture which is substantially diametrically opposed to the aperture communicating with the pumping means through the axis of rotation of the sections and which is in constant communication with the nitrogen discharge passageway.

The features and advantages of the method and apparatus according to the present invention will become more apparent from the following description taken in conjunction with the accompanying drawings in which corresponding parts and elements are denoted by like reference numerals and characters throughout the figures and in which.

The apparatus according to the present invention will be described as applied to an internal combustion engine of a motor vehicle but such is solely by way of example. The apparatus herein disclosed is, therefore, applicable to a power plant or prime mover of any type insofar as the power plant or prime mover uses a principle of operation in which the energy of heat generated by combustion of an air-fuel mixture is converted into a mechanical work.

Figure 1:
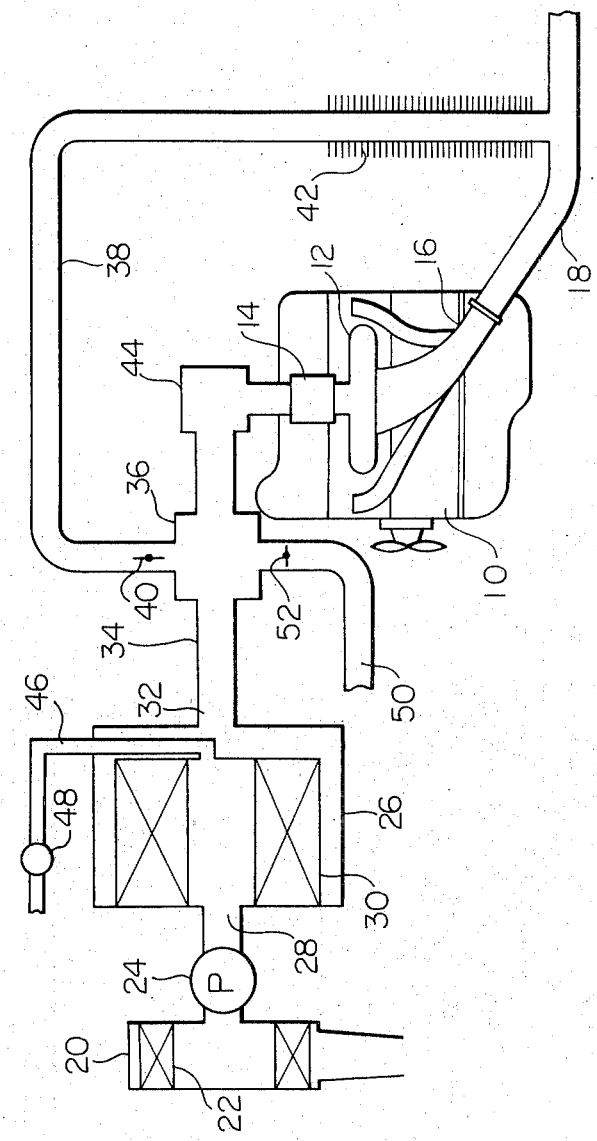
FIG. 1 is a schematic view showing a preferred embodiment of the apparatus according to the present invention, the apparatus being shown as applied to an internal combustion engine of a motor vehicle.

Referring now to the drawings, first to FIG. 1, the apparatus according to the present invention is thus shown as combined with an automotive internal combustion engine which is generally designated by reference numeral 10. The engine 10 is connected through an intake manifold 12 to an engine carburetor 14 through which the air-fuel mixture is to be supplied to the engine and an exhaust manifold 16 through which the exhaust gases from the engine are discharged to the open air via an exhaust pipe 18 forming part of the exhaust system of the engine 10. Upstream of the carburetor 14 is located an air cleaner 20 having a cleaner element 22 through which the atmospheric air is sucked in and cleaned of dust, as customary.

The apparatus according to the present invention now comprises a pheumatic pump 24 having its suction side connected to a clean side of the air cleaner 20. Downstream of the pneumatic pump 24 is located an air-denitrifying unit 26 communicating with the discharge side of the pump 24 through an air supply passage 28. The air-denitrifying unit 26 has nitrogen separating means 30 using the previously mentioned nitrogen impermeable membrane or the pack of the previously defined processed zeolite in the form of particles. The air-denitrifying unit 26 has an outlet port 32 through which the air-denitrifying unit communicates with a denitrified-air passageway 34 and through this passageway with a mixing chamber 36, as shown. The air under pressure delivered from the discharge side of the pneumatic pump 24 is thus cleared of the nitrogen molecules as the air is passed through the air-denitrifying unit 26 and the denitrified air which is mostly an oxygen gas is passed to the mixing chamber 36 through the denitrified-air passageway 34.

An exhaust recirculation passageway 38 leads from the exhaust pipe 18 and is opened into the mixing chamber 36 through a flow control valve 40 so that the exhaust gases discharged from the engine 10 during operation are recirculated to the mixing chamber 36 at a rate controlled by the valve 40. The exhaust recirculation passageway 38 is herein shown as being provided with cooling fins 42 by which the exhaust gases being recirculated are cooled before they enter the mixing chamber 36. The denitrified air from the air-denitrifying unit 26 is thus mixed with the recirculated exhaust gases in a controlled proportion. The mixing chamber 36 communicates with the carburetor 14 through a mixture passageway 44 in which the mixture of the denitrified air and recirculated exhaust gases are mixed with fuel for the engine in a usual manner.

In order to prevent deterioration of the nitrogen separating means 30 as invited by deposit of the nitrogen molecules thereon as the denitrifying process proceeds, a nitrogen discharge passage 46 having a suction pump 48 having its suction side communicating with the air-denitrifying unit 26 and its discharge side opened to the atmosphere.

When, in operation, the engine 10 is operating with the pneumatic pump 24 operative and with the suction pump 48 inoperative, the atmospheric air is forced from the air cleaner 20 to the air-denitrifying unit 26 through the pneumatic pump 24. The air under pressure thus supplied to the denitrifying unit 26 is cleared of its nitrogen molecules by the nitrogen separating means 30 of the unit 26. The thus denitrified air which mostly consists of an oxygen gas is passed to the mixing chamber 36 in which the denitrified air is mixed with the recirculated exhaust gases which are directed thereto through the exhaust recirculation passageway 38 at a rate controlled by the flow control valve 40. It is, in this instance, preferable that the denitrified air and recirculated exhaust gases be mixed with each other in a proportion substantially corresponding to the proportion of the oxygen and nitrogen in the atmospheric air in view of the combustion efficiency of the engine 10 under normal driving condition of the motor vehicle. The resultant mixture of the denitrified air and recirculated exhaust gases is drawn to the carburetor 14 and mixed therein with the fuel in a liquid or emulsion state so as to supply a gasified fuel to the engine 10 through the intake manifold 12.

As the above described operation proceeds the nitrogen molecules separated from the air in the air-denitrifying unit 26 are deposited on the nitrogen impermeable membrane or processed zeolite of the nitrogen separating means 30 with consequent reduction in the ability of the means 30 to separate the nitrogen molecules. When the nitrogen impermeable membrane or processed zeolite of the means 30 is inactivated, then the suction pump 48 is actuated so that the nitrogen molecules on the nitrogen impermeable membrane or processed zeolite are forced therefrom and discharged to the open air as an inert innoxious gas through the nitrogen discharge passageway 46. The air-denitrifying unit 26 restores its ability of separating the nitrogen molecules from the supplied air upon completion of purging of the nitrogen separating means 30 so that the denitrified air containing an oxygen gas in a major proportion is delivered from the unit 26 for a second time. To enable the suction pump 48 to operate at proper timings, the pump 48 may be connected to suitable computing means (not shown) capable of monitoring the contamination of the air-denitrifying unit 26 with the nitrogen molecules, although the pump 48 may be otherwise controlled.

The exhaust gases from the engine 10 contains substantially no nitrogen gas in the absence of nitrogen in the denitrified air to be mixed with the exhaust gases with the result that a negligibly small amount of nitrogen oxides is discharged to the open air as long as the denitrifying unit 26 operates under a proper condition. The amounts of hydrocarbons and carbon monoxides in the exhaust gases are also reduced significantly because such combustible compounds, re-combusted in the engine as the exhaust gases are recirculated.

If, now, the recirculated exhaust gases are admixed to the denitrified air mostly containing the oxygen gas in the proportion between the nitrogen and oxygen of the normal atmosphere as previously noted, then the mixture to be mixed with the fuel in the carburetor consists of 20 per cent by volume of oxygen gas and 80 per cent by volume of recirculated exhaust gases. Since, in this instance, substantially no nitrogen is contained in the gas that lends itself to the combustion in the engine, a negligibly small amount of nitrogen oxides is produced as a result of the combustion. Since, moreover, 80 per cent by volume of exhaust gases are recirculated as above mentioned, the amount of exhaust gases discharged to the open air is reduced to one fifth of that discharged in the case of the prior art combustion systems. This means that theoretically the total amount of toxic compounds other than the nitrogen oxides, viz., the hydrocarbons, carbon monoxides and sulfides, is also reduced to one fifth as compared with the conventional combustion systems.

In order that the combustion efficiency of the engine be maintained at proper levels under heavy load conditions in which an increased amount of oxygen is required of the combustion in the engine, an additional air supply passageway 50 may be provided which leads from the atmosphere and which is opened into the mixing chamber 36 through a flow control valve 52. This additional air supply passageway 50 is adapted to admix additional air to the denitrified air and recirculated exhaust gases under the heavy load condition of the engine 10 in a proportion which is varied by the flow control valves 40 and 50. These flow control valves 40 and 50 are usually controlled by suitable computing means (not shown) which is responsive to the working conditions of the engine 10. If, thus, the flow control valve 50 in the air supply passageway 50 is controlled in such a manner that the mixture of the denitrified air consisting essentially of an oxygen gas and the atmospheric air from the passageway 50 contains 60 per cent by volume of oxygen and 40 per cent by volume of nitrogen and if the flow control valve 40 in the exhaust recirculation passageway 38 is so controlled as to pass the exhaust gases at a rate which is predetermined in a manner that the mixture of the denitrified air from the passageway 34, atmospheric air from the passageway 50 and exhaust gases from the passageway 38 contains 20 per cent by volume of oxygen, then the mixture contributing to the combustion of the fuel in the engine 10 will contain:

| Oxygen gas | 1/5 |
|---|---|
| Nitrogen gas | 1/5×40/60=2/15 |
| Recirculated exhaust gases | 1−1/5−2/15=2/3 |

From this it is apparent that the concentration of the nitrogen gas in the mixture contributing to the combustion is, as compared with the conventional combustion system, given as:

$$2/15 \times 5/4 = 1/6.$$

Thus, the amount of nitrogen oxide produced as a result of the combustion in the engine is also one sixth of that produced in the case of the prior art combustion system. In view, moreover, of the fact that two thrids by volume of the total amount of exhaust gases are recirculated so that only one third of the exhaust gases are discharged to the open air, the amount of nitrogen oxides discharged to the atmosphere is actually reduced, as compared with the case with the existing combustion system, to the order of:

$$1/6 \times 1/3 = 1/18 \text{ (approx. 5\%)}.$$

This means that the amount of nitrogen oxides to be discharged to the open air is about 95 per cent reduced where the method and apparatus according to the invention is placed into practice even if additional fresh air is supplied to the denitrified air and recirculated exhaust gases. It is, moreover, evident that the total amount of other toxic compounds such as the hydrocarbons, carbon monoxides and sulfides is reduced to one third in view of the fact that only one third of the exhaust gases are discharged to the open air. The method and apparatus according to the present invention are therefore useful for reducing not only the nitrogen oxides.

In the embodiment shown in FIG. 1, the supply of denitrified air is interrupted temporarily when the suction pump 48 in the nitrogen discharge passageway 46 is operative to suck in the nitrogen gas from the nitrogen impermeable membrane or processed zeolite of the nitrogen separating means 28. In order to save waste of time resulting from such interruption of the supply of the denitrified air, the system for denitrifying the air may be preferably divided into two independent units which are arranged to operate alternately during operation, an embodiment achieving such purpose being illustrated in FIG. 2.

Figure 2:
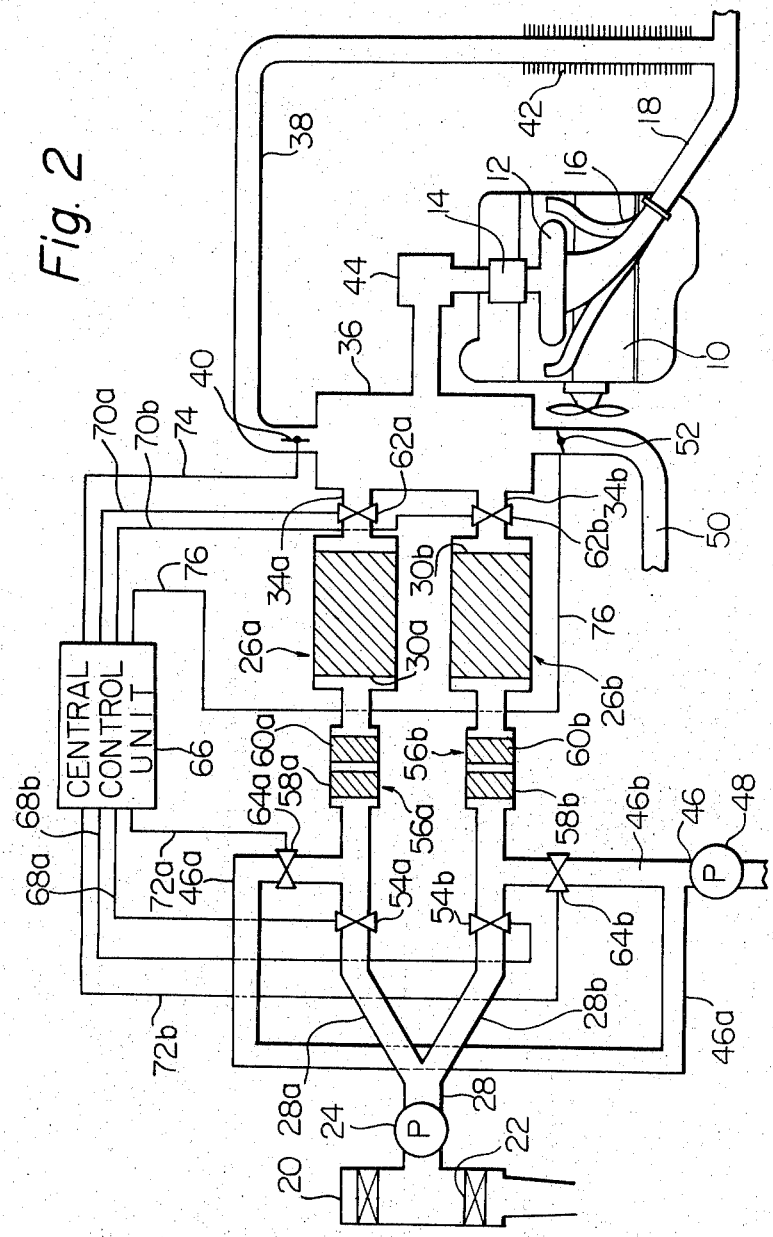
FIG. 2 is also a schematic view showing another preferred embodiment of the apparatus according to the present invention as applied to an automotive internal combustion engine.

Referring to FIG. 2, the air supply passage 28 leading from the pneumatic pump 24 is divided into a pair of branch passageways 28a and 28b which communicate through flow shut-off valves 54a and 54b with a pair of air-denitrifying units 26a and 26b having nitrogen separating means 30a and 30b, respectively. The branch passageways 28a and 28b are herein shown as incorporating therein dehumidifiers 56a and 56b, respectively, which are adapted to remove moisture from the air supplied from the pneumatic pump 24 through the branch passageways 28a and 28b. By way of example, these dehumidifiers 56a and 56b respectively have hygroscopic materials 58a and 58b of silica gel and carbon monoxide absorbants 60a and 60b of a zeolite of formed particles. This zeolite as a molecular sieve for the carbon monoxide may be substitued, if preferred, by a material which is commercially available under the registered trade name of "Ascarite" manufactured by A. H. Thomas Company, U. S. A. The nitrogen separating means 30a and 30b, on the other hand, may comprise the molecular sieves of the processed zeolite or the nitrogen impermeable membranes as previously noted.

The air-denitrifying units 26a and 26b communicate with a common mixing chamber 36 through denitrified-air passageway 34a and 34b respectively. These denitrified-air passageways 34a and 34b are provided with flow shut-off valves 62a and 62b, respectively. The mixing chamber 36 communicates on one side with the carburetor 14 of the engine 10 through a mixture passageway 44 and on the other side with the exhaust pipe 18 from the engine 10 through an exhaust recirculation passageway 38 having a flow control valve 40, similarly to the arrangement shown in FIG. 1. Also similarly to the arrangement of FIG. 1, an additional air supply passageway 50 may preferably provided, having one end opened to the atmosphere and the other end debouching into the mixing chamber 36 through a flow control valve 52.

From between the flow shut-off valves 54a and 54b and dehumidifiers 56a and 56b of the air supply branch passageways 28a and 28b lead a pair of nitrogen discharge branch passageways 46a and 46b, respectively. These nitrogen discharge branch passageways 46a and 46b communicate with a passageway 46 having a common suction pump 48 through flow shut-off valves 64a and 64b, respectively.

The flow shut-off valves 54a and 54b; 62a and 62b; and 64a and 64b are preferably solenoid actuated valves and are connected to a central control unit 66 through electric lines 68a and 68b; 70a and 70b; and 72a and 72b, respectively. The flow control valves 40 and 52 in the exhaust recirculation passageway 38 and additional air supply passageway 50 are also connected to the central control unit 66 through electric lines 74 and 76, respectively. The central control unit 66 includes computing means which are constructed arranged in any desired manner depending upon the practical operation requirements of the apparatus according to the present invention, responsive to the varying driving conditions of the motor vehicle, especially of the engine 10 thereof so as to control the individual flow shut-off valves and flow control valves in accordance with the sensed driving conditions of the motor vehicle. Thus, one set of associated flor shut-off valves 54a, 62a and 64b and the other set of associated valves 54b, 62b and 64a are in open conditions alternately in cycles which are controlled by the central control unit 66 while the flow control valves 40 and 52 are also controlled by the control unit 66 so as to provide for controlled flow rates of the recirculated exhaust gases and atmospheric air through the passages 38 and 50, respectively.

If, in operation, the flow shut-off valves 54b and 62a of one denitrified-air supply line and the flow shut-off valve 64a of the nitrogen discharge passageway 46a of the other denitrified-air supply line are kept closed, then the flow shut-off valves 54a, 62a and 64b are in open positions concurrently. As a consequence, the atmospheric air cleared of the dust by the air cleaner 20 is pumped by the pneumatic pump 24 to the air supply branch passageway 28a with the flow shut-off valve 54b of the other branch passageway 28b closed. The air is cleared of moisture and carbon monoxide by the hygroscopic material 58a and carbon monoxide absorbant 60a of the dehumidifier 56a and passed to the air-denitrifying unit 26a at which the nitrogen molecules of the air are sieved by the nitrogen separating means 30a of the previously described nature. The resultant denitrified air is directed to the mixing chamber 36 through the flow shut-off valve 62a in the open position and is therein mixed with the recirculated exhaust gases from the recirculation passageway 38 and with the additional atmospheric air from the additional air supply passageway 50 if the valve 52 is in an open position. The mixture of the denitrified air, recirculated exhaust gases and additional air, if supplied, is drawn to the carburetor 14 through the mixture passage 44, as previously described in connection with the embodiment shown in FIG. 1.

While the air from the pneumatic pump 24 is being cleaned through one air-denitrifying line including the dehumidifier 56a and air-denitrifying unit 26a, the nitrogen molecules which have been deposited and accumulated in the air-denitrifying unit 26b of the other denitrifying line are, together with the moisture and carbon monoxide in the dehimidifier 56b, are sucked in and discharged to the open air by the action of the suction pump 48 via the nitrogen discharge passageway 46b with the flow shut-off valve 64b in an open position.

As the nitrogen separating operation proceeds in the air-denitrifying line including the dehumidifier 56a and air-denitrifying unit 26a, the nitrogen impermeable membrane or processed zeolite of the nitrogen separating means 30a of the line becomes inactive or at least hss active so that the nitrogen separating ability of the means 30a deteriorates. This condition is responded to by the central control unit 66 and, as a consequence, the flow shut-off valves 54a, 62a and 64b are closed and, in turn, their counterpart valves 54b, 62b and 64a are opened so as to provide communication between the air supply passage 28 and mixture passage 34b and between the air-denitrifying unit 26a and suction pump 48 through the nitrogen discharge passageway 46a. The denitrified air is now supplied through the air supply branch passage 28b and air-denitrifying unit 26b and, concurrently, the other air-denitrifying unit 26a as well as the dehumidifier 56b associated therewith is purged by the action of the suction pump 48.

Figure 3:
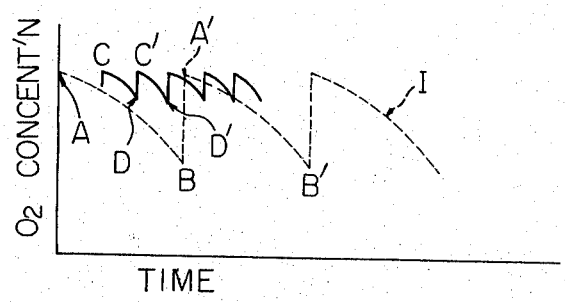
FIG. 3 is a graphic representation of examples of the variation in the concentration of the oxygen in the air as denitrified in the apparatus according to the present invention.

The air-denitrifying lines thus including the independent nitrogen separating means 30a and 30b are, in this manner, purged alternately to each other before the nitrogen separating means are saturated with the nitrogen molecules and lose or have impaired their nitrogen separating abilities, with the result that the concentration of the oxygen in the denitrified air passed to the mixing chamber is maintained at a satisfactorily high level. An example of the variation in the concentration of the oxygen gas the thus denitrified air is indicated by a plot I in FIG. 3. As seen herein, the plot A is generally of a saw-tooth waveform having peaks A, A', . . . and bottoms B, B' . . . as the time lapses. Thus, the concentration A of the denitrified air initially supplied from one of the air-denitrifying line droops as the nitrogen molecules are accumulated on the nitrogen separating means of the line. When the concentration of the oxygen gas in the denitrified air is reduced to a value B, then the particular air-denitrifying line is shut off and purged of the nitrogen deposit and, in turn, the other air-denitrifying line which has been re-activated in the preceding cycle is now made operative so that the concentration of the oxygen in the denitrified air rises to a value A' and droops toward a value B'. The cycles of the saw-teeth waveform of the plot I are thus in agreement with the durations in which the two air-denitrifying lines of the arrangement shown in FIG. 2. The curved segment A–B is representative of the decrease in the concentration of the oxygen gas in the denitrified air resulting from the decrease in the nitrogen separating efficiency in one air-denitrifying line while the curved segment A'–B' is representative of the decrease in the concentration of the oxygen gas in the denitrified air in the other denitrifying line.

Figure 4:
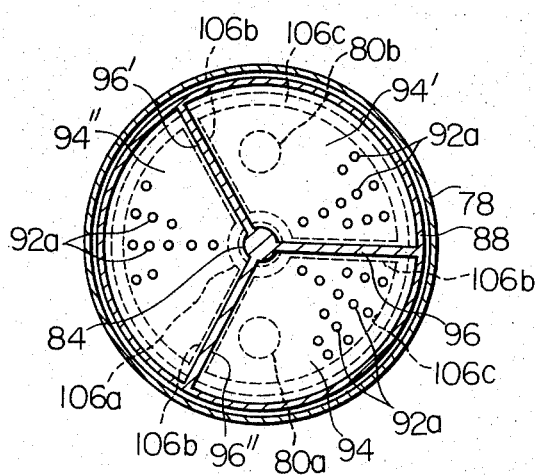
FIG. 4 is a longitudinal sectional view showing a preferred form of nitrogen separating means of the apparatus according to the present invention.
Figure 5:
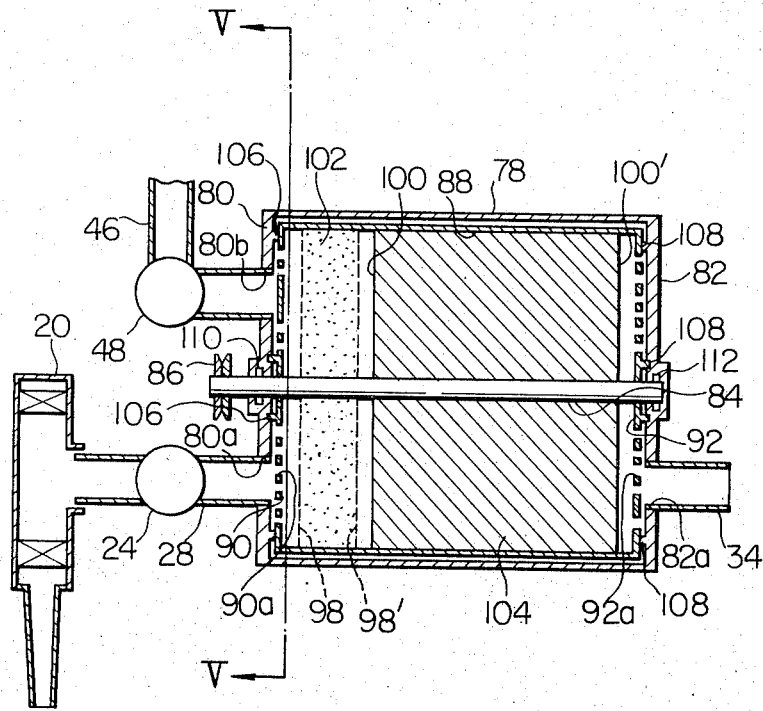
FIG. 5 is a cross sectional view taken on line V—V of FIG. 4.

The fluctuation in the concentration of the oxygen gas in the denitrified air is more or less detrimental to the operation of the internal combustion engines or any other combustion power plants such as boilers, deteriorating the combustion efficiency and sometimes failing to reduce the toxic compounds in the exhaust gases to a satisfactory level. FIGS. 4 and 5 illustrate a preferred form of air-denitrifying unit which is adapted to maintain the concentration of the oxygen gas in the denitrified air at an increased level constantly throughout operation thereof.

Referring to FIGS. 4 and 5, the air-denitrifying unit comprises an outer stationary drum or cylinder 78 having end plates 80 and 82. The outer stationary drum 78 carries at the centers of the end plates 80 and 82 a shaft 84 extending axially throughout the drum 78. This shaft 84 is rotatable on the drum 78, driven at a controlled speed through a pulley 86 or a gearing and a suitable reduction mechanism (not shown) from suitable driving means such as the power plant with which the denitrifying unit is combined. An inner rotary drum or cylinder 88 is journalled to the end plates 80 and 82 of the outer stationary drum 78 through the shaft 84 and is rotatable with and about this shaft 84 within the outer stationary drum 78. The inner rotary drum 88 has end plates 90 and 92 which have formed therein a number of apertures 90a and 92a, respectively, and which are located at appreciable spacings from the inner faces of the end plates 80 and 82, respectively, of the outer stationary drum 78. As seen in FIG. 4, the inner rotary drum 88 is internally radially divided into three separate chambers 94, 94' and 94'' by radial partition walls 96, 94' and 96'' extending longitudinally between the end plates 90 and 92 of the inner rotary drum 88 and angularly, equidistantly spaced from each other. Although these chambers are herein shown as three in number, such is merely by way of example and, therefore, it is as desired to have formed only two or even more than three chambers in the inner rotary drum. Within each of these chambers 94, 94' and 94'' are formed separate compartments (not numbered) one of which is defined by longitudinally spaced, meshed or apertured radial walls 98 and 98' and the other of which is defined by longitudinally spaced, meshed or apertured radial walls 100 and 100' as seen in FIG. 5. The compartment which is defined by the gas permeable walls 98 and 98' is packed with a hygroscopic and/or carbon monoxide absorptive material 102 and the other compartment defined by the gas permeable walls 100 and 100' and located posterior to the former has mounted therein a pack 104 of the processed zeolite which is capable of separating nitrogen molecules from air.

The chambers 94, 94' and 94'' are hermetically sealed from each other and from the cylindrical space between the peripheral walls of the inner and outer drums 78 and 88, respectively, by sealing elements 106 and 108 which are attached to outer faces of the end plates 90 and 92 of the inner rotary drum 88 and which are slidably forced against inner faces of the end plates 80 and 82 of the outer stationary drum 78. As seen in FIG. 5, the sealing element 106 interposed between the end plates 80 and 82 of the outer and inner drums 78 and 88, respectively, has inner circular section 106a surrounding the shaft 84, radial sections 106b extending along the ends of the radial partition walls 96, 96' and 96'', and an outer circular section 106c extending along an outer circumferential end of the end plate 90 of the inner rotary drum 88. The outer sealing element 108 has a configuration which is entirely identical to the sealing element 106 and, as such, the description of the latter applies as it is to the former. Designated by reference numerals 110 and 112 are sealing elements which are interposed between the end portions of the shaft 84 and the end plates 80 and 82, respectively, of the outer stationary drum 78 carrying the shaft 84.

The end plates 80 and 82 of the outer stationary drum 78 have formed therein apertures 80a and 82a, respectively, which are aligned with each other in a direction parallel to the axis of rotation of the inner rotary drum 88. The air supply passage 28 leading from the pneumatic pump 24 mounted downstream of the air cleaner 20 is opened at its leading end to the aperture 80a in the end plate 80 while the denitrified air passageway 34 leads from the aperture 82a in the end plate 82 as illustrated in FIG. 5. These apertures 80a and 82b are in constant communication with each other through apertures 90a and 92a in the end plates 90 and 92, respectively, of the inner rotary drum 88.

The end plate 80 of the outer stationary drum 78 is further provided with an aperture 80b which is substantially diametrically opposed to the aperture 80a. The nitrogen discharge passageway 46 leads from this aperture 80b and is opened to the atmosphere through the suction pump 48.

During operation, the inner rotary drum 88 is driven through the shaft 84 to rotate within the outer stationary drum 78 at a controlled speed through the pulley 86 or gearing and a suitable reduction mechanism. As the inner rotary drum 88 is thus rotated about the shaft 84, the chambers 94, 94' and 94'' are successively brought into alignment with the aligned apertures 90a and 92a in the end plates 90 and 92, respectively, of the outer stationary drum 78 and with the aperture 90b in the end plate 90 of the drum 79.

When, thus, the chamber 94 is aligned with the apertures 90a and 92a communicating with the air supply passageway 28 and denitrified-air passageway 34, respectively, and the chamber 94' adjacent this chamber 94 is aligned with the aperture 90b leading to the nitrogen discharge passageway 46, as seen in FIG. 4, then the air supplied from the pneumatic pump 24 is forced into the chamber 94 of the rotating inner rotary drum 88 through the apertures 90a in the end plate 90. The air entering the chamber 94 is first cleared of its moisture and carbon monoxide content as it passed through the hygroscopic and carbon monoxide absorptive material 102 and of its nitrogen molecules as it passes through the pack 104 of the processed zeolite. The denitrified air obtained in this manner is discharged to the denitrified-air passageway 34 through the apertures 92a in the end plate p of the inner rotary drum 88 before the chamber 94 is brought out of alignment with the aperture 82a in the end plate 90 of the outer stationary drum 78. While this occurs, the chamber 94' aligned with the aperture 80b leading to the suction pump 48 is subject to suction so that the nitrogen molecules as well as the moisture and carbon monoxide deposited in the chamber 94' are released from the pack 104 and moisture and carbon monoxide absorptive material 102 in the chamber 94' and are forced out of the nitrogen discharge passageway 46. The chamber 94' is in this manner purged of the nitrogen and carbon monoxide deposits by the time at which the chamber 94' is brought out of alignment with the aperture 80b in the end plate 80 of the outer stationary drum 78. Then, the chamber 94'' is aligned with the apertures 80a and 82a so as to absorb the nitrogen molecules and carbon monoxide therein while the chamber 94 is purged of the accumulated nitrogen molecules and carbon monoxide. The chambers 94, 94' and 94'' are thus cyclically brought into the positions to denitrify the air and to be purged of the nitrogen deposit as the inner rotary drum 88 is driven to rotate within the outer stationary drum 78. The cycle of operation in which the individual chambers 94, 94' and 94'' are aligned with the apertures 80a and 80b in the end plate 80, viz., with the passageways 28 and 46 can be selected arbitarily through selection of the number of the chambers to be formed in the inner rotary drum 88 and/or the speed of rotation of the rotary drum 88.

Through use of the air-denitrifying unit having the above described construction and operation, the concentration of the oxygen gas in the denitrified air supplied therefrom is maintained at a satisfactorily elevated level because the plurality of nitrogen separating means constituting the denitrifying unit are cleaned in sufficiently minute cycles before the separating means lose or have deteriorated their ability of separating the nitrogen molecules from the air passed therethrough. An example of the variation in the concentration of the oxygen gas in the denitrified air obtained by the use of the unit of such character is indicated by a plot II in FIG. 3. This plot II is generally of a saw-tooth waveform which is similar to the plot I indicating the denitrifying characteristics of the denitrifying unit shown in FIG. 2. The plot II, however, shows that the concentration of the oxygen gas in the denitrified air is maintained at high levels throughout the operation of the denitrifying unit although such concentration fluctuates to an appreciable degree as from point C to D and from C' to D'. It is, in this instance, apparent that the point C or C' is indicative of the concentration of the oxygen in the denitrified air delivered from one of the chambers 94, 94' and 94'' at the initial stage of its alignment with the apertures 80a and 82a in the end plates 80 and 82 of the outer stationary drum while the point D or D' is indicative of the concentration of the oxygen delivered, from that particular chamber at the final stage of its alignment with these apertures 80a and 82a.

Figure 6:
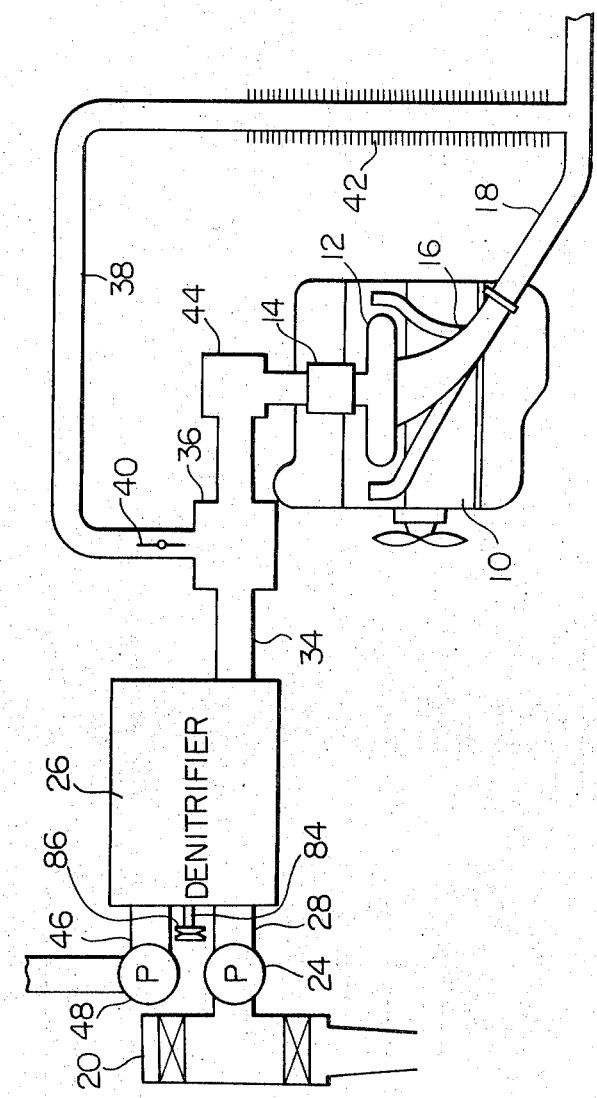
FIG. 6 is a schematic view showing an apapratus according to the present invention as using the nitrogen separating means illustrated in FIGS. 4 and 5, the apparatus being also shown as applied to an automotive internal combustion engine.

FIG. 6 illustrates an arrangement in which the air-denitrifying unit 26 having the construction shown in FIGS. 4 and 5 is placed on use with the internal combustion engine 10 of a motor vehicle, similarly to the arrangements shown in FIGS. 1 and 2. As illustrated, the denitrified-air passageway 34 is opened into the mixing chamber 36 leading to the carburetor 14 through the mixture passageway 44 and communicating with the exhaust pipe 18 through the exhaust recirculation passageway 38. The operation of the arrangement herein shown in essentially similar to that of the arrangement shown in FIG. 1 except for the operation of the air-denitrifying unit 26 the operation of which has been described.

It will now be appreciated from the above description that the method and apparatus according to the present invention are useful in minimizing the concentration of the nitrogen oxides in the exhaust gases from various power plants and, at the same time, reducing the other toxic compounds such as the hydrocarbons, carbon monoxides and sulfides with use of a simple construction. No separate or independent apparatus is required to reduce the hydrocarbons, carbon monoxides and sulfides in the exhaust gases, in contrast to the prior art techniques in which these toxic compounds are reduced by the use an apparatus which is independent from the apparatus to reduce the nitrogen oxides. The method and apparatus herein disclosed are, therefore, expected to significantly contribute to the solution of the air pollution problems caused by the operation of various power plants such as the automotive internal combustion engines and industrial boilers. The types of the molecular sieves as named in this specification are not limitative of the present invention and, as such, any desired type of nitrogen separating means will find application in the method and apparatus according to the present invention.

What is claimed is:

1. A method for minimizing the content of nitrogen oxides in exhaust gases from a combustion power plant comprising the steps of passing through nitrogen separating means a stream of air for the power plant for substantially denitrigying the air; adding to the denitrified air a portion of exhaust gases from the power plant for diluting the denitirified air; and mixing the diluted air with a fuel for producing a combustible mixture for the power plant.

2. A method as claimed in claim 1 further comprising a step of adding to the diluted air the atmospheric air during a condition in which the power plant is operated with a relatively heavy load.

3. An apparatus for separating nitrogen from air comprising:
a rotary drum having elongated chambers for the passage of air therethrough, each extending parallel to the axis of rotation of said rotary drum from one sector in one end of said rotary drum to the opposite sector in the opposite end of said rotary drum and containing therein a pack of nitrogen impermeable material;
a housing within which said rotary drum is mounted, said housing having respective end plates to the opposite ends of said rotary drum, one of said end plates having formed therein first and second apertures which are substantially opposed to each other through the axis of rotation of said rotary drum, the other end plate having formed therein a third aperture which is axially aligned to said first aperture along the axis of said rotary drum;
sealing means carried by said sectors and sliding on the adjacent end plates of said housing to thereby seal one from another of said elongated chambers;

air supply passage means communicating with said first aperture for passing air into one of said elongated chambers;

denitrified air passage means communicating with said third aperture for removing denitrified air from said one elongated chamber; and nitrogen discharge passage means communicating with said second aperture for removing nitrogen unable to permeate through said one elongated chamber.

4. An apparatus as claimed in claim 3, wherein said air supply passage means includes a pump for supplying the atmospheric air under pressure to said first aperture.

5. An apparatus as claimed in claim 4, wherein said nitrogen discharge passage means includes a suction pump to expose said second aperture to the suction.

6. An apparatus as claimed in claim 5, wherein said nitrogen impermeable material includes processed zeolite which is in the form of particles.

7. An apparatus as claimed in claim 3, wherein each of said elongated chambers contains a pack of hygroscopic and carbon compound absorptive materials upstream of said pack of nitrogen impermeable material therein.

8. An apparatus for minimizing the content of nitrogen oxides in exhaust gases from a combustion power plant having a carburetor, comprising nitrogen separating means operable to separate nitrogen from air passing therethrough to a mixing chamber; a denitrified-air passageway leading from an outlet of said nitrogen separating means and opening to said mixing chamber; an exhaust gas recirculation passageway leading from an exhaust pipe of opposite power plant and opening to said mixing chamber; end a mixture passageway leading from said mixture chamber to said carburetor of the combustion power plant.

9. An apparatus as claimed in claim 8 wherein said nitrogen separating means comprises a rotary drum having elongated chambers for air flow therethrough, each extending parallel to the axis of rotation of said rotary drum from end to end and containing therein a pack of nitrogen impermeable material; a housing within which said rotary drum is mounted, said housing having respective end plates to the oposite ends of said rotary drum, one of said en plates having formed therein first and second aperture which are substantially opposed to each other through the axis of rotation of said rotary drum, the other end plate having formed therein a third aperture which is axially aligned to said first aperture along the axis of said rotary drum; sealing means between said end plates and the opposed ends of said rotary drum, said sealing means being stationary with respect to said rotary drum and sliding on the adjacent end plates of said housing to seal one elongated chamber from another; air supply passage means opening in said housing and supplying air under pressure to any one of said elongated chambers as the rotary drum rotates about the axis; denitrified air passage means opening into said housing and removing denitrified air from said any one of said elongated chambers and supplying the denitrified air through said denitrified-air passageway to said mixing chamber; and nitrogen discharge passage means also opening into said housing and removing nitrogen unable to permeate through said elongated chambers.

10. An apparatus as claimed in claim 8, further comprising an additional air supply passageway leading from the atmosphere and opening at its downstream end into said mixing chamber and a flow control valve incorporated in said additional air supply passageway and controlling the supply of atmospheric air to said mixing chamber.

11. An apparatus for minimizing the content of nitrogen oxides in exhaust gases from a combustion power plant having a carburetor comprising pumping means for delivering a stream of an air under pressure, nitrogen separating means operable to separate nitrogen molecules from the air, said stream of air being passed through said nitrogen separating means for substantially denitrifying the air, at least one denitrifying air passageway leading from said nitrogen separating means for passing therethrough the denitrified air delivered from said nitrogen separating means, an exhaust gas recirculation passageway leading from an exhaust pipe of said power plant for recirculation therethrough exhaust gases from the power plant, a mixing chamber into which said denitrified air passageway and said exhaust gas recirculation passageway are opened at their downstream ends for mixing the denitrified air and recirculated exhaust gases with each other therein, a passageway leading from said passageway to said carburetor of said power plant, and additional air supply passageway leading from the atmosphere and opening at its downstream end into said mixing chamber and a flow control valve incorporated in said additional air supply passageway adapted for passing the atmospheric air to said mixing chamber during a condition in which said power plant is operated with a relatively heavy load, said nitrogen separating means comprising at least two sections which are separate from each other and passage means adapted to provide alternate communication between said pumping means and said at least two sections of the nitrogen separating means, a suction pump, and nitrogen discharge passage means adapted to provide alternate communication between said suction pump and said at least two sections of the nitrogen separating means to remove nitrogen unable to impermeate through said at least two sections.

* * * * *